(12) United States Patent
Tsuda et al.

(10) Patent No.: US 6,673,454 B1
(45) Date of Patent: Jan. 6, 2004

(54) THERMOSETTING POWDER COATING COMPOSITION

(75) Inventors: Nobuhiko Tsuda, Settsu (JP); Takahiro Kitahara, Settsu (JP); Ryuji Iwakiri, deceased, late of Minoo (JP), by Miyuki Iwakiri, legal representative; Masaru Nagato, Settsu (JP); Ryoichi Fukagawa, Settsu (JP); Go Nagai, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/674,331

(22) PCT Filed: Apr. 23, 1999

(86) PCT No.: PCT/JP99/02184

§ 371 (c)(1),
(2), (4) Date: May 10, 2001

(87) PCT Pub. No.: WO99/57208

PCT Pub. Date: Nov. 11, 1999

(30) Foreign Application Priority Data

May 1, 1998 (JP) .......................................... 10-122383
Sep. 21, 1998 (JP) .......................................... 10-266550

(51) Int. Cl.$^7$ ......................... B32B 27/26; B32B 27/30; B32B 31/26; C08F 214/18
(52) U.S. Cl. ....................... 428/421; 428/422; 427/195; 525/55; 525/165; 525/121; 525/377; 526/242; 526/250; 526/254
(58) Field of Search ................................. 428/421, 422; 525/326.2, 326.3, 326.4, 121, 165, 377, 55; 526/242, 250, 254; 427/185, 195

(56) References Cited

U.S. PATENT DOCUMENTS 3,445,434 A     5/1969  Stilmar ......................... 526/255
5,962,612 A  * 10/1999  Takakura et al. ............ 526/249

FOREIGN PATENT DOCUMENTS

| EP | 0 301 557 | 2/1989 |
| EP | 0 481 478 A1 | 4/1992 |
| EP | 1 090 936 | 4/2001 |
| JP | 46-31679 | 9/1971 |
| JP | 57-137365 | 8/1982 |
| JP | 61-281170 | 12/1986 |
| JP | 1-103670 | 4/1989 |
| JP | 2-60968 | 3/1990 |
| JP | 2-185573 | 7/1990 |
| JP | 2-235969 | 9/1990 |
| JP | 3-95276 | 4/1991 |
| JP | 4-18473 | 1/1992 |
| JP | 4-80216 | 3/1992 |
| JP | 4-506088 | 10/1992 |
| JP | 5-247380 | 9/1993 |
| JP | 6-108103 | 4/1994 |
| JP | 06184243 A * | 7/1994 |
| JP | 6-299092 | 10/1994 |
| JP | 6-345822 | 12/1994 |
| JP | 7-41699 | 2/1995 |
| JP | 7-216263 | 8/1995 |
| JP | 7-509014 | 10/1995 |
| JP | 9-165535 | 6/1997 |
| JP | 9-302271 | 11/1997 |
| JP | 9-302274 | 11/1997 |
| JP | 10-7943 | 1/1998 |
| WO | 83/03612 | 10/1983 |
| WO | WO 97/21776 | 6/1997 |

OTHER PUBLICATIONS

Machine assisted translation of JP 06–184243A, Jul. 1994.*
Database WPI, Section Ch, Week 199431, Derwent Publications Ltd., London, GB, XP002177533 and JP 06 184243, Jul. 5, 1994.
Supplementary European Search Report for EP 99 91 7138 dated Oct. 18, 2001.
Database WPI, Section Ch, Week 199431, Derwent Publiations Ltd., London, GB, XP002177533 and JP 06 184243, Jul. 5, 1994.

* cited by examiner

*Primary Examiner*—Ramsey Zacharia
(74) *Attorney, Agent, or Firm*—Sughrue Mion, PLLC

(57) ABSTRACT

To provide the thermosetting powder coating composition which comprises a fluorine-containing copolymer having crosslinkable functional group and a curing agent, in which the fluorine-containing copolymer has a fluoroolefin unit, has a fluorine content of not less than 10% by weight and is not dissolved in tetrahydrofuran substantially. A coating line can be shared with other powder coating composition because even when the composition mixes to other powder coating composition, it causes no coating defects, and yet a coated article having a coating film excellent in physical properties can be provided.

21 Claims, No Drawings

THERMOSETTING POWDER COATING COMPOSITION

TECHNICAL FIELD

The present invention relates to a thermosetting powder coating composition. Particularly the present invention relates to a thermosetting powder coating composition which is less affected by mixing of other powder coating composition at coating.

BACKGROUND ART

Powder coating compositions containing a fluorine-containing resin are known in various patent publications such as JP -B-6-104792, JP-A-1-103670 and JP-A-8-41131, and can give a coated article being excellent in weather resistance and having a good appearance.

In an actual coating site of a powder coating, from the viewpoint of productivity, coating and baking of plural powder coatings are carried out on one coating line, and operation of the line is changed over for each powder coating.

However only by mixing of a small amount of the powder coating containing a fluorine-containing resin to other resin powder coating, various defects arise on a coating film of the other resin. This is one of the reasons why fluorine-containing resin-based powder coatings are not spread on the market irrespective of excellent physical properties of a coating film thereof.

The present inventors have continued their studies to find out a fluorine-containing resin powder coating composition which is less affected by mixing of other coating composition on a coating line and have found that the above-mentioned defects attributes to miscibility of a fluorine-containing resin with other resin and further that a fluorine-containing copolymer featured by insolubility in tetrahydrofuran (THF) can solve the above-mentioned problem. Thus the present invention was completed.

DISCLOSURE OF INVENTION

Namely the present invention relates to the thermosetting powder coating composition characterized in that the composition comprises (A) a fluorine-containing copolymer having crosslinkable functional group and (B) a curing agent and that the fluorine-containing copolymer (A) has a perfluoroolefin unit, has a fluorine content of not less than 10% by weight and is not dissolved in THF substantially.

It is preferable that the fluorine-containing copolymer (A) having crosslinkable functional group has a melting point of not more than 160° C. and a melt flow rate (MFR) of from 1 to 1,000 g/10 min when measured at 130° C. at a load of 2.1 kg.

Examples of the preferred fluorine-containing copolymer (A) having crosslinkable functional group are those comprising tetrafluoroethylene (TFE), hexafluoropropylene (HFP), ethylene (ET) and monomer unit having crosslinkable functional group and being copolymerizable therewith or those comprising TFE, HFP, isobutylene (IB) and monomer unit having crosslinkable functional group and being copolymerizable therewith.

Example of the preferred crosslinkable functional group is at least one of hydroxyl, carboxyl and epoxy.

Further it is preferable to introduce a vinyl ester compound unit, for example, vinyl benzoate unit and/or vinyl pivalate unit as a unit constituting the copolymer (A).

The present invention also relates to a coated article obtained by coating the above-mentioned thermosetting powder coating composition to a substrate and then baking it.

BEST MODE FOR CARRYING OUT THE INVENTION

First the fluorine-containing copolymer (A) having crosslinkable functional group and used in the present invention is explained below.

The fluorine-containing copolymer (A) having crosslinkable functional group is one which has at least the following characteristics (1) to (4).

(1) Having a Perfluoroolefin Unit

Example of perfluoroolefin is, for instance, at least one of perfluoroolefins such as TFE, HFP and perfluoro(vinyl ether). Particularly TFE and HFP are preferred. When the copolymer has a perfluoroolefin unit, a coating film being excellent in weather resistance, water resistance and stain-proofing property can be obtained. It is preferable that the perfluoroolefin unit is contained in the copolymer in an amount of not less than 5% by mole, especially 10 to 95% by mole.

(2) Having a Fluorine Content of Not Less Than 10% by Weight

The fluorine content derives from the perfluoroolefin unit and/or other fluorine-containing monomer. The fluorine content is not less than 10% by weight, preferably 20 to 75% by weight for the same reason as in (1) above.

Examples of the other fluorine-containing monomer are, for instance, vinylidene fluoride, trifluoroethylene, monofluoroethylene, chlorotrifluoroethylene, and the like. Those other fluorine-containing monomer units are optional units. A content thereof is not more than 30% by mole, usually 0 to 10% by mole.

(3) Being Insoluble in THF Substantially

Being insoluble in THF means being inferior in compatibility with a resin soluble in THF. Namely when after coating of a powder coating of a resin soluble in THF, the powder coating of the present invention is coated on the same coating line, or when carrying out coating in the reverse order, the fluorine-containing copolymer (A) is less affected by other resin, and the influence of mixing of the fluorine -containing copolymer (A) on the other powder coating can be decreased.

Being insoluble substantially encompasses the case of being soluble in THF in a concentration of less than 0.5% by weight. This is because when substantially measuring an intrinsic viscosity [η] of the resin in THF solution, a reliable intrinsic viscosity [η] cannot be measured unless the copolymer has a solubility of about 0.5% by weight or more.

Examples of the resin which is soluble in THF and is used for a powder coating are, for instance, an acrylic resin, polyester resin, epoxy resin, fluorine-containing resin described in JP-B-6-104792, and the like.

(4) Having Crosslinkable Functional Group

The crosslinkable functional group has functions of giving a curing site to the fluorine-containing copolymer (A) and giving a highly hard coating film subjected to thermosetting by a reaction with a curing agent, thus increasing a surface hardness while maintaining good flexibility.

In the present invention, examples of the crosslinkable functional group are, for instance, functional groups represented by the formulae (i):

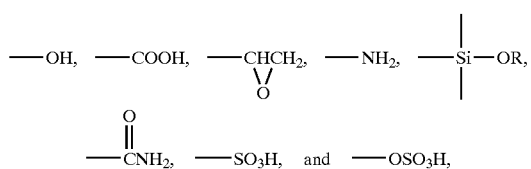

wherein R is an alkyl group having 1 to 3 carbon atoms.

Among the above-mentioned functional groups, preferred are those represented by the formulae (ii):

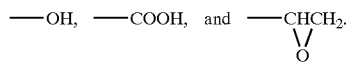

Examples of the monomer capable of introducing such a functional group are, for instance, perfluorobutenoic acid (PFBA), a fluorine-containing monomer having an ether unit described in JP-A-8-67795 and in addition, non-fluorine-containing monomer having carboxyl such as maleic anhydride (MAL); hydroxyl-containing monomer such as hydroxybutyl vinyl ether (HBVE) and allyl alcohol; epoxy-containing monomer such as glycidyl vinyl ether (GVE); vinylmethoxysilane, vinylethoxysilane, monomer having hydrolyzable silyl group described in JP-A-8-120211, monomer having aminopropoxy group, and the like.

From the viewpoint of reactivity in the baking temperature range in case of combination use with a known curing agent, preferred are PFBA, carboxyl-containing monomer such as maleic anhydride, hydroxyl-containing monomer such as HBVE and glycidyl-containing monomer such as GVE.

The crosslinkable functional group forms a curing site, and its amount varies depending on reactivity of the functional group and kind of a curing agent. It is preferable that based on the whole fluorine-containing resin, an acid value is from 1 to 300 mgKOH/g, a hydroxyl value is from 1 to 200 mgKOH/g or an equivalent of epoxy is from 5 to 15,000 equivalents.

It is further preferable that the copolymer has the following characteristics.

(5) Having a Melting Point of Not More Than 160° C.

When the melting point is in this range, a good flow characteristic is given at baking.

(6) MFR Being From 1 to 1,000 g/10 min when Measured at 130° C. at a Load of 2.1 kg (The Measuring Conditions are Hereinafter the Same)

MFR is an important factor at melt-kneading or baking, particularly at baking. The larger the MFR is, the more the flowing property of molten resin increases. Therefore a smooth and uniform coating film is easily formed. But on the other hand, dripping easily occurs, and at kneading, shearing is not applied to a kneaded composition and uniform kneading is difficult. There occurs a defect that water resistance and impact resistance of a coating film are lowered. When the MFR is too small, flowability at baking is insufficient and a coating film does not become smooth and uniform. A preferred MFR is from 5 to 100 g/10 min.

From the above-mentioned points of view, a content of the unit giving crosslinkable functional group may be selected in the range of from 0.1 to 30% by mole, especially 1 to 20% by mole based on the fluorine-containing copolymer.

Also when the fluorine-containing copolymer (A) contains a vinyl ester compound unit as a constitutive unit thereof, adhesion of the obtained coating film to a substrate is enhanced, and also compatibility with a curing agent is improved, thus giving a coating film having a high gloss. Examples of the vinyl ester compound are non-fluorine-containing vinyl esters, for instance, vinyl benzoate (VBz), vinyl pivalate (VPi) and a mixture thereof. It is desirable that the vinyl ester compound is introduced in the copolymer (A) in an amount of 0.1 to 25% by mole, preferably 0.5 to 20% by mole.

The fluorine-containing copolymer having crosslinkable functional group can be obtained by copolymerizing each of the above-mentioned monomers. The polymerization may be carried out by usual polymerization methods such as emulsion polymerization, suspension polymerization and solution polymerization. Also a monomer having crosslinkable functional group may be grafted on the copolymer.

Non-restricted examples of the fluorine-containing copolymer having crosslinkable functional group of the present invention are those having the following combinations of monomers and satisfy the requirements (1) to (4) and further preferably (5) and (6).

| | | |
|---|---|---|
| (I) | ① Perfluoroolefin | not less than 5% by mole |
| | ② Other fluorine-containing monomer | 0 to 95% by mole |
| | ③ Other non-fluorine-containing monomer | 0 to 95% by mole |
| | ④ Crosslinkable functional group-containing monomer | not less than 0.1% by mole |
| (II) | ① At least one of TFE and HFP | not less than 5% by mole |
| | ② Other fluorine-containing monomer | 0 to 95% by mole |
| | ③ Non-fluorine-containing olefin | 0 to 95% by mole |
| | ④ Monomer containing functional group represented by the above-mentioned formula (i) | not less than 0.1% by mole |
| (III) | ① At least one of TFE and HFP | not less than 10% by mole |
| | ② Other fluorine-containing monomer | 0 to 20% by mole |
| | ③ Non-fluorine-containing olefin | 10 to 70% by mole |
| | ④ Monomer containing functional group represented by the above-mentioned formula (i) | not less than 0.1% by mole |
| (IV) | ① At least one of TFE and HFP | not less than 20% by mole |
| | ② Other fluorine-containing monomer | 0 to 5% by mole |
| | ③ Ethylene (ET) | 20 to 50% by mole |
| | ④ Monomer containing functional group represented by the above-mentioned formula (ii) | not less than 0.1% by mole |
| (V) | ① At least one of TFE and HFP | not less than 20% by mole |
| | ② Other fluorine-containing monomer | 0 to 5% by mole |
| | ③ Isobutylene (IB) | 20 to 50% by mole |
| | ④ Monomer containing functional group represented by the above-mentioned formula (ii) | not less than 0.1% by mole |
| (VI) | ① At least one of TFE and HFP | not less than 10% by mole |
| | ② Other fluorine-containing monomer | 0 to 20% by mole |
| | ③ Non-fluorine-containing olefin | 10 to 70% by mole |
| | ④ Monomer containing functional group represented by the above-mentioned formula (i) | not less than 0.1% by mole |
| | ⑤ Vinyl ester compound | 1 to 15% by mole |
| (VII) | ① At least one of TFE and HFP | not less than 20% by mole |
| | ② Other fluorine-containing monomer | 0 to 5% by mole |
| | ③ At least one of ET and IB | 20 to 50% by mole |
| | ④ Monomer containing functional group represented by the above-mentioned formula (ii) | not less than 0.1% by mole |
| | ⑤ At least one of VBz and VPi | 1 to 15% by mole |

Non-restricted examples of more concrete copolymer are as follows.

TFE/HFP/ET/PFBA copolymer (mole ratio: 25 to 40/10 to 20/35 to 48/0.1 to 10), TFE/HFP/ET/HBVE copolymer (mole ratio: 25 to 40/10 to 20/35 to 48/0.1 to 10), TFE/HFP/ET/GVE copolymer (mole ratio: 25 to 40/10 to 20/35 to 48/0.1 to 10), TFE/HFP/IB/HBVE copolymer (mole ratio: 25 to 40/10 to 20/35 to 48/0.1 to 10), TFE/HFP/ET/HBVE/VBz copolymer (mole ratio: 25 to 40/10 to 20/35 to 48/0.1 to 10/3 to 8), TFE/HFP/ET/HBVE/VBz/VPi copolymer (mole ratio: 25 to 40/10 to 20/35 to 48/0.1 to 10/3 to 8/3 to 8)

TFE/HFP/ET copolymer described in JP-A-8-41131 does not have functional group and does not satisfy the Requirement (4). A fluorine-containing copolymer (JP-A-9-165535) mainly comprising vinylidene fluoride (VdF) does not satisfy insolubility in THF (Requirement (3)).

It is preferable that the fluorine-containing copolymer having crosslinkable functional group and used in the present invention further has the following physical property.

Glass transition temperature (Tg): It is preferable that the glass transition temperature is not more than 150° C., especially 40° to 120° C. (measured with DSC) from the viewpoint of giving a coating film being excellent in leveling property and appearance even at relatively low baking temperature.

The above-mentioned fluorine-containing copolymer having crosslinkable functional group not only gives excellent weather resistance, chemical resistance and stain removable property to an obtained coating film but also improves impact resistance and flexibility.

Then the curing agent which is another component of the thermosetting powder coating composition of the present invention is explained below.

A curing agent to be used may be selected optionally depending on kind of the above-mentioned crosslinkable functional group, a melt-kneading temperature at making a coating, a baling temperature, etc. In former thermosetting powder coating compositions containing a fluorine-containing copolymer, selection of a curing agent was difficult from the viewpoint of its compatibility with the copolymer, and kind of usable curing agent, particularly a combination with a resin was limited. According to the present invention, since crosslinkable functional group is introduced into the above-mentioned fluorine-containing copolymer, kind and combination of usable curing agent can be extended.

Examples of the usable curing agent are, for instance, epoxy or glycidyl compounds such as alicyclic epoxy resin, GMA acryl, aliphatic oxysilane, triglycidyl isocyanurate (TGIC), diglycidyl terephthalate, diglycidyl p-hydroxybenzoate, spiroglycol diglycidylether and hydantoin compounds; isophorone diisocyanate, tolylene diisocyanate, xylilene diisocyanate, 4,4'-diphenylmethane diisocyanate, hexamethylene diisocyanate, dimers thereof and blocked isocyanates obtained by blocking an isocyanate group of alcohol-modified polyisocyanate with a blocking agent (for example, ε-caprolactam, phenol, benzyl alcohol, methyl ethyl ketone oxime, etc.); polybasic acid curing agent such as β-hydroxyalkylamide; polycarboxylic acids, e.g. aliphatic dibasic acids such as fumaric acid, succinic acid, adipic acid, azelaic acid, sebacic acid and dodecandioic acid (DDA) and acid anhydrides such as phthalic anhydride, trimellitic anhydride and pyromellitic anhydride; tetramethoxymethylglycoluryl, isocyanate -modified silane coupling agent, and other curing agents described in JP-B-6-104792, JP-A-7-188587 and JP-A-1-103670.

Among them, particularly from the viewpoint of compatibility with the crosslinkable functional group in the fluorine-containing copolymer (A), preferred combinations are as follows.
(1) Crosslinkable functional group: Hydroxyl group Curing agent: Blocked isocyanate, polyurethodione
(2) Crosslinkable functional group: Carboxyl group Curing agent: Triglycidyl isocyanurate, β-hydroxyalkylamide, GMA acryl
(3) Crosslinkable functional group: Glycidyl group Curing agent: Aliphatic dibasic acid It is preferable that an amount of the curing agent is from 0.1 to 1.2 equivalents, especially 0.5 to 1.0 equivalent to an amount of functional group contained in the fluorine-containing copolymer (A). When less than 0.1 equivalent, an effect of improvement by crosslinking in crack resistance at bending and impact resistance is not sufficient and water resistance is also lowered. When more than 1.2 equivalents, it results in lowering of appearance of a coating film.

In addition to the curing agent, a curing catalyst may be blended. Examples of the curing catalyst are, for instance, quaternary ammonium salts such as tetrabutylammonium chloride, tetrabutylammonium bromide and tetrabutylammonium iodide; quaternary phosphonium salts such as ethyltriphenylphosphonium acetate; phosphines such as triphenylphosphine; imidazoles such as 2-methylimidazole; organotin compounds such as dibutyltindilaurate and stannous octanoate; methyltolylsulfoneimide and stannous methanesulfonate, and the like. The curing catalyst may be blended in an amount of from about 0.1 part (part by weight, hereinafter the same) to about 3 parts to 100 parts of the fluorine-containing copolymer (A).

In addition to those additives, to the powder coating composition of the present invention may be blended various additives usually added in the field of paints, in an amount not lowering an effect of the present invention. Examples of such other additives are a pigment, extended pigment, flow control agent, antioxidant, thermal deterioration preventive agent, ultraviolet ray absorber, foaming inhibiting agent, flatting control agent, defoaming agent, electric charge control agent, antistatic agent, and the like.

Since a coating film formed with the fluorine-containing copolymer (A) of the present invention is transparent, various kinds of pigments can be used. For example, there are organic pigments such as condensed azo compounds, isoindolinone, quinacridone, diketopyrrolopyrol, anthraquinone, dioxazine and various organometal complexes; inorganic pigments such as titanium oxide (Preferred are one having rutile-type structure, and further preferable are alumina-treated, silica-treated or zirconia-treated titanium oxides), red iron oxide, yellow iron oxide, black iron oxide, carbon, chromium oxide, lead chromate, white lead and molybdenum orange; metal powders such as aluminum powder and stainless steel powder; and the like. Among them, inorganic pigments are preferred from the viewpoint of weather resistance which is one of the features of the present invention, particularly to maintain a gloss retention ratio and inhibit fading of color. A preferred content of the pigment is not more than 80 parts on the basis of 100 parts of the resin.

Examples of the extended pigment are, for instance, talc, silica, calcium carbonate, barium sulfate, mica, diatomaceous silica, asbestos, basic silicate, and the like.

Examples of the flow control agent are, for instance, acrylate polymers such as polylauryl acrylate, polybutyl acrylate and poly-2-ethylexyl acrylate; ester of polyethylene glycol and perfluorocarboxylic acid and fluorine-containing polymers having a low melting point such as VdF/TFE/HFP copolymer (excluding VdF polymers having crosslinkable functional group); silicone polymers such as polydimethylsiloxane and polymethylphenylsiloxane; and the like.

Then the process for preparing the powder coating composition of the present invention is explained below. As mentioned above, one of the features of the composition of the present invention is such that coating defects attributable to contamination are hard to arise when changing to or from a powder coating of other resin on a powder coating line.

The preparation process comprises the basic steps such as a pre-pulverizing step, dry blending step, melt-kneading step, pulverizing step and classifying step. (Pre-pulverizing step)

As mentioned above, the fluorine-containing copolymer having crosslinkable functional group can be obtained in various forms such as powder, flake, bulk, and the like. In order to obtain good mixing in the following dry blending step, the copolymers are formed into pellets of not more than 5 mm or pulverized into an average particle size of about 50 μm to about 100 μm. (Dry blending step)

The fluorine-containing copolymer having crosslinkable functional group in the form of powder or pellet, curing agent, curing catalyst and additives such as a pigment are dry-blended. A mixer to be used is usually a high speed mixer, low speed mixer or Henschel mixer. If a temperature inside the mixer is elevated too high, a reaction of the crosslinkable functional group with the curing agent advances. Therefore it is preferable that the inside temperature is maintained at a temperature of not more than 80° C. by controlling time and mixer temperature.

Melt-kneading Step

The above-mentioned dry-blended product is put in a melt-kneader, melted at a temperature of not less than a melting point or Tg of the fluorine-containing copolymer (A) to knead sufficiently, and then extruded in the form of sheet. In that case, an extruder which is high in productivity in continuous production is used preferably. Examples of usual melt-kneader are a single screw extruding kneader, two screw extruding kneader, heating kneader and heating roll. A melt-kneading temperature and time are 80° to 120° C. and usually several tens of seconds, respectively so that the reaction of the functional group in the resin and the curing agent does not advance too much.

Pulverizing Step

The sheet melt-extruded in a specified form is, after cooling and solidifying, roughly pulverized into chips of about 5 mm to about 15 mm and then finely pulverized. In that case, it is preferable that the pulverizer is maintained at a constant temperature with very low temperature pulverizing, air-cooling or water-cooling means. As the pulverizer, a high speed impact pulverizer, high speed pin type pulverizer, or the like is used preferably.

Classifying Step

The finely pulverized powder is classified with a centrifugal classifier, blower type sieving machine, sieve shaking machine, or the like. A narrow particle size distribution is preferable. It is preferable that an average particle size of the powder coating composition is from 1 to 100 μm, especially 10 to 50 μm. When less than 1 μm it is difficult to control a coating thickness because the particles are subject to electrostatic repulsion, and there occur problems with lowering of a coating efficiency due to lowering of collecting efficiency with a cyclone in case of recycling and also lowering of safety workability due to permeation through a protection mask. When more than 100 μm, leveling property is lowered, thereby causing problems that appearance of a coating film becomes poor and coating thin cannot be carried out. An average particle size is determined by a desired coating thickness. For example, in case of a coating thickness of about 40 μm to about 50 μm, the average particle size is preferably 25 to 30 μm. The smaller the average particle size is, the more the appearance of coating film is enhanced, and coating thin is possible, but a blockage occurs at spray-coating, thereby causing lowering of workability and adhesion of a coating.

The thermosetting powder coating composition of the present invention can be prepared in such a manner mentioned above.

The thermosetting powder coating composition of the present invention can be coated on various substrates by known applying methods. Then the coating film obtained by baking the coated film is excellent in its appearance such as smoothness and gloss, surface hardness, mechanical properties such as flexibility and impact resistance, adhesion to a substrate, weather resistance, stain-proofing property and water resistance.

Namely the present invention relates to the coated article obtained by coating the above-mentioned thermosetting powder coating composition on a substrate and then baking it for curing.

For coating, known coating methods can be employed. For example, there are electrostatic powder spray coating method, fluid bed coating method, electrostatic dip coating method, and the like. A coating thickness is usually in the range of from 20 to 100 μm.

Then the coating film is baked. A baking temperature is not more than 200° C., usually not less than 150° C., preferably 160° to 200° C. A baking time is from 10 to 30 minutes, usually 15 to 20 minutes. At that baking temperature, the powder coating composition of the present invention exhibits excellent flowability and gives a smooth and uniform baked coating film.

The powder coating composition of the present invention is also excellent in adhesion to a substrate. The preferable substrate is one which has electric conductivity to enable electrostatic coating. Examples thereof are, for instance, various metal plates such as stainless steel plate, aluminum plate, steel plate and galvanized steel plate, and in addition, heat resistant engineering plastics such as polycarbonate, polyphenylene oxide, polyethylene terephthalate, polyether sulfone, polyamideimide and polyether ether ketone which are endowed with electric conductivity by dispersing a conductive carbon therein. It is preferable that those substrates are subjected to removal of rust by sand blasting or acid washing, baking, degreasing by washing with a solvent, with emulsion type cleaner or alkali, phosphating with zinc phosphate, calcium phosphate or iron phosphate, or chemical conversion treatment such as chromate treatment, alumite treatment or chromium phosphate treatment. In that case, though the coating composition of the present invention has enough adhesion to those substrates even in case of a single use thereof, as case demands, it is possible to carry out intermediate coating of zinc rich rust-preventive primer or various primers such as an epoxy resin and acrylic resin together. The intermediate coating may be applied in any form of solvent type coating, aqueous coating, powder coating or the like. It is preferable to apply in the form of powder coating from the viewpoint of workability in the present invention.

The coated article of the present invention is used for various applications. Non-restricted examples of the application are, for instance, applications described in "Handbook of Powder Coating Technique" edited by Nippon Funtai Toso Kogyo Kyokai (1994), pp 169 to 173 such as construction and building material, electric communication device, vehicles, road materials, water and gas service materials, metal products, domestic appliances, machines, tools, measuring instruments, medical instruments, utensils for maintenance, agricultural materials, ships, sports and leisure products, and the like.

Then the present invention is explained by means of examples, but is not limited to them.

Preparation Example 1

A 4-liter pressure resistant reactor equipped with a stirrer was charged with 1,000 ml of deionized water, and feeding of pressurized nitrogen and deairing were repeated to remove dissolved oxygen. Then the reactor was charged with 407 g of chlorofluoroethane (HCFC-141b), 15 g of perfluorobutenoic acid (PFBA) and 794 g of hexafluoropropane (HFP) successively. A pressure inside the reactor was increased up to 12 kgf/cm² at 35° C. with a monomer mixture of tetrafluoroethylene (TFE)/ethylene (ET) in a % by mole ratio of 82/18. Then the reactor was charged with 4 g of cyclohexane and 48 g of 25% flon 225 solution of isobutyryl peroxide, and the above-mentioned monomer mixture was supplied continuously so that the inside pressure became constant at 12 kgf/cm². Every three hours after starting of the reaction, 8 g of 25% flon 225 solution of isobutyryl peroxide and 3 g of PFBA were added three times. After 12-hour reaction, the inside of the reactor was restored to normal temperature and normal pressure to terminate the reaction. After the obtained solid was washed and dehydrated, it was vacuum-dried at 80° C. to give 133 g of TFE/HFP/ET/PFBA copolymer (white powder). Components, melting point (Tm), glass transition temperature (Tg), MFR and solubility in THF of the obtained copolymer were measured by the methods mentioned below. Melting point, glass transition temperature: A heat balance of 10 mg of VdF polymer was measured at a heat-up speed of 10° C./min in a temperature range of −25° C. to 200° C. by using Thermal Analysis System (available from Perkin Elmer Co., Ltd.), and a top peak was assumed to be a melting point. Since the glass transition temperature (Tg) was detected as two variable polar points, it was obtained by a center point method.

MFR: Measurement was carried out under the conditions of 130° C., a load of 2.1 kg and 10 minutes. In case of much flow, a period of time in which 20 g of resin flowed was measured and converted to an amount of resin flowing for 10 minutes.

Solubility in THF: 0.5 Gram of resin in the form of powder was put in 10 ml of THF at room temperature, and after allowed to stand for 72 hours, dissolving state was observed with naked eyes.

The results are shown in Table 1.

Preparation Examples 2 to 8 and Comparative Preparation Examples 1 to 2

Polymerization was carried out in the same manner as in Preparation Example 1 except that monomers, amount of cyclohexane and polymerization time were changed as shown in Table 1. The same measurements as in Preparation Example 1 were carried out with respect to the obtained fluorine-containing copolymer. The results are shown in Table 1.

TABLE 1

|  | Prep. Ex. | | | | | | | | Com. Prep. Ex. | |
| --- | --- | --- | --- | --- | --- | --- | --- | --- | --- | --- |
|  | 1 | 2 | 3 | 4 | 5 | 6 | 7 | 8 | 1 | 2 |
| Monomer components | | | | | | | | | | |
| TFE/ET (% by mole ratio) | 82/18 | 82/18 | 82/18 | 82/18 | 82/18 | — | 82/18 | 82/18 | 82/18 | 76/24 |
| TFE/IB (% by mole ratio) | — | — | — | — | — | 82/18 | — | — | — | — |
| HFP (g) | 794 | 794 | 794 | 794 | 794 | 794 | 794 | 794 | 794 | 900 |
| PFBA (g) | 24 | 24 | — | — | — | — | — | — | — | — |
| HBVE (g) | — | — | 21 | — | 21 | 21 | 21 | 21 | — | — |
| GVE (g) | — | — | 21 | — | — | — | — | — | — | — |
| VBz (g) | — | — | — | — | — | — | 10 | 10 | — | — |
| VPi (g) | — | — | — | — | — | — | — | 10 | — | — |
| Amount of cyclohexane (g) | 4 | 4 | 2 | 2 | 10 | 1 | 2 | 1 | 4 | 4 |
| Polymerization time (hr) | 12 | 12 | 12 | 12 | 24 | 12 | 15 | 18 | 12 | 12 |
| Obtained weight (g) | 133 | 165 | 142 | 146 | 36 | 130 | 130 | 90 | 178 | 125 |
| Components of polymer | | | | | | | | | | |
| TFE | 35 | 33 | 31 | 34 | 33 | 30 | 30 | 31 | 35 | 32 |
| HFP | 16 | 18 | 18 | 17 | 18 | 17 | 17 | 16 | 18 | 20 |
| ET | 45 | 45 | 48 | 44 | 45 | — | 44 | 42 | 47 | 48 |
| IB | — | — | — | — | — | 49 | — | — | — | — |
| PFBA | 4 | 4 | — | — | — | — | — | — | — | — |
| HBVE | — | — | 3 | — | 4 | 4 | 4 | 3 | — | — |
| GVE | — | — | — | 5 | — | — | — | — | — | — |
| VBz | — | — | — | — | — | — | 5 | 5 | — | — |
| Vpi | — | — | — | — | — | — | — | 3 | — | — |
| Melting point (° C.) | 151 | 123 | 123 | 118 | 118 | 85 | 110 | 105 | 120 | 132 |

TABLE 1-continued

|  | Prep. Ex. | | | | | | | | Com. Prep. Ex. | |
| --- | --- | --- | --- | --- | --- | --- | --- | --- | --- | --- |
|  | 1 | 2 | 3 | 4 | 5 | 6 | 7 | 8 | 1 | 2 |
| Glass transition temperature (° C.) | 51 | 42 | 38 | 35 | 38 | 33 | 35 | 35 | 53 | 65 |
| MFR (g/10 min) | 2 | 67 | 56 | 42 | 823 | 550 | 85 | 150 | 73 | 0.5 |
| Solubility in THF | Insoluble | Insoluble | Insoluble | Insoluble | Insoluble | Insoluble | Insoluble | Insoluble | Insoluble | Insoluble |

Abbreviations in Table 1 represent the following compounds.
TFE: Tetrafluoroethylene
HFP: Hexafluoropropylene
ET: Ethylene
IB: Isobutylene
PFBA: Perfluorobutenoic acid
HBVE: Hydroxybutyl vinyl ether
GVE: Glycidyl vinyl ether
VBz: Vinyl benzoate
VPi: Vinyl pivalate Comparative Preparation Example 3

A 1-liter pressure resistant reactor was charged with 523 g of t-butanol (t-BA), 53 g of cyclohexyl vinyl ether (CHVE), 30 g of isobutyl vinyl ether (IBVE), 83 g of hydroxybutyl vinyl ether (HBVE), 3.3 g of potassium carbonate and 0.23 g of azobisisobutylonitrile, followed by solidifying with liquid nitrogen and deairing to remove dissolved oxygen. After that, 167 g of pressurized CTFE was introduced and the reactor was heated up to continue a reaction at 65° C. over 10 hours. Then after cooling, residual monomer was distilled off, a solution was collected and a dispersion medium was distilled off at 60° C. under reduced pressure to give a resin. This resin dissolved in THF. A glass transition temperature and MFR thereof were 24° C. and 116, respectively.

EXAMPLE 1

100 Gram of fluorine-containing copolymer having crosslinkable functional group which was obtained in Preparation Example 1, 4 g of triglycidyl isocyanurate (TGIC available from Rhom & Haas Co., Ltd.), 15 g of titanium oxide, 0.5 g of flowability control agent (MODAFLOW available from Monsanto Chemical Co., Ltd.) and 0.5 g of benzoin were dry-blended at 25° C. for 15 minutes with Henschel mixer to give a uniform mixture. The mixture was melt-kneaded at 100° C. for one minute with Buss Co-kneader (available from Buss Co., Ltd.), extruded into a sheet and then pelletized. Then 20 g of pellets was pulverized at room temperature (about 20° C.) for five minutes with Micro Hammer Mill (available from IKA Co., Ltd.). The obtained powder was passed through a 200 mesh screen for classification to give a powder coating composition having an average particle size of 50 μm.

EXAMPLES 2 to 8 and Comparative Examples 1 to 3

Powder coating compositions were obtained in the same manner as in Example 1 except that fluorine-containing copolymer and curing agent were changed as shown in Table 2.

With respect to those powder coating compositions, an effect of a remaining other resin on the composition was determined in the manner mentioned below.

To 100 g each of the powder coating compositions of Examples 1 to 8 and Comparative Examples 1 to 3, was mixed 0.5 g of polyester resin powder (FINEDIC M-8026 available from Dai-Nippon Ink Co., Ltd.) having an average particle size of 50 μm. Then the compositions were coated on a 0.3 mm thick JIS 2003 A 714 chemical conversion-treated aluminum sheet at an applied voltage of 60 kV with a corona discharge type powder coating gun (GX3300 available from Onoda Cement Kabushiki Kaisha), and then immediately baked at 180° C. for 20 minutes to give a coated article.

Appearance of the coated article was observed with naked eyes. The results are shown in Table 2.

TABLE 2

|  | Example | | | | | | | | Comparative Example | | |
| --- | --- | --- | --- | --- | --- | --- | --- | --- | --- | --- | --- |
|  | 1 | 2 | 3 | 4 | 5 | 6 | 7 | 8 | 1 | 2 | 3 |
| Fluorine-containing resin (g) | Prep. Ex. 1 (100) | Prep. Ex. 2 (100) | Prep. Ex. 3 (100) | Prep. Ex. 4 (100) | Prep. Ex. 5 (100) | Prep. Ex. 6 (100) | Prep. Ex. 7 (100) | Prep. Ex. 8 (100) | Com. Prep. Ex. 1 (100) | Com. Prep. Ex. 2 (100) | Com. Prep. Ex. 3 (100) |
| Curing agent (g) | TGIC (4) | TGIC (4) | B-NCO (7.5) | DDA (7.5) | B-NCO (7.5) | B-NCO (7.5) | B-NCO (7.5) | B-NCO (7.5) | — (—) | — (—) | B-NCO (13) |

TABLE 2-continued

|  | Example | | | | | | | | Comparative Example | | |
| --- | --- | --- | --- | --- | --- | --- | --- | --- | --- | --- | --- |
|  | 1 | 2 | 3 | 4 | 5 | 6 | 7 | 8 | 1 | 2 | 3 |
| Effect of remaining other resin | Good appearance | Good appearance | Good appearance | Good appearance | Good appearance | Good appearance | Good appearance | Godd appearance | Good appearance | Occurrence of nibs | Occurrence of cissing |

Abbreviations in Table
TGIC: Triglycidyl isocyanurate
B-NCO: Blocked isocyanate
DDA: Dodecyldioic acid EXAMPLES 9 to 16 and Comparative Examples 4 to 6

The powder coating compositions shown in Table 3 were coated on a 0.3 mm thick JIS 2003 A 714 chemical conversion-treated aluminum sheet at an applied voltage of 60 kV with a corona discharge type powder coating gun (GX3300 available from Onoda Cement Kabushiki Kaisha), and then immediately baked at 180° C. for 20 minutes to give a coated article.

The following characteristics of the coated article were determined. The results are shown in Table 3.

Thickness of Coating Film

Coating thickness is measured with an eddy-current instrument EL10D for measuring a coating thickness (available from Kabushiki Kaisha Sanko Denshi Kenkyusho).

Appearance of Coating Film

Fluorescent light is emitted to the coated article and a shape of the light reflected on the surface of the coating film is evaluated with naked eyes.
A: There is no deformation on the shape of light.
B: There is a deformation slightly on the shape of light.
C: There is a deformation greatly on the shape of light.

Gloss

A specular gloss at an angle of 60 degrees is measured according to JIS K 5400-6.7.

Pencil Hardness

A pencil hardness is measured according to JIS K 5400.

Impact Resistance

After carrying out a falling ball impact test according to AAMA605, peeling test is conducted and impact resistance is evaluated under the following criteria.
○: There is neither cracking nor peeling on the coating film.
x : Cracking and peeling are found on the coating film.

Flexibility

A bending test is carried out according to AAMA605.

Adhesion

A cross cut test for adhesion is carried out according to AAMA605.

Boiling Water Resistance

After a test of dipping in boiling water according to AAMA605, adhesion is evaluated.

Stain-proofing Property

An oily ink (red) is applied to the coated plate, and after allowed to stand at room temperature for 24 hours, is wiped off with a cloth impregnated with ethanol. Stain-proofness is evaluated with a color difference ΔE before and after the test under the following criteria.
A: ΔE is less than 1.
B: ΔE is not less than 1 and less than 5.
C: ΔE is not less than 5.

Weather Resistance

A gloss retention is measured after a lapse of 2,000 hours by using an accelerated weather resistance tester (sunshine weather-o-meter).

TABLE 3

|  | Example | | | | | | | | Comparative Example | | |
| --- | --- | --- | --- | --- | --- | --- | --- | --- | --- | --- | --- |
|  | 9 | 10 | 11 | 12 | 13 | 14 | 15 | 16 | 4 | 5 | 6 |
|  | Powder coating composition | | | | | | | | | | |
|  | Ex. 1 | Ex. 2 | Ex. 3 | Ex. 4 | Ex. 5 | Ex. 6 | Ex. 7 | Ex. 8 | Com. Ex. 1 | Com. Ex. 2 | Com. Ex. 3 |
| Thickness of coating film (μm) | 40 | 40 | 40 | 40 | 40 | 40 | 40 | 40 | 40 | 40 | 40 |
| Appearance of coating film | A | A | A | A | A | A | A | A | A | A | A |
| Gloss | 58 | 72 | 75 | 77 | 78 | 75 | 80 | 84 | 78 | 65 | 78 |
| Pencil hardness | 2H | 2H | H | 2H | H | H | 2H | 2H | 2B | 2B | HB |
| Impact resistance | ○ | ○ | ○ | ○ | ○ | ○ | ○ | ○ | ○ | ○ | ○ |
| Flexibility | 1T | 1T | 1T | 1T | 2T | 1T | 1T | 1T | 1T | 1T | 3T |

TABLE 3-continued

| | Example | | | | | | | | Comparative Example | | |
|---|---|---|---|---|---|---|---|---|---|---|---|
| | 9 | 10 | 11 | 12 | 13 | 14 | 15 | 16 | 4 | 5 | 6 |
| | Powder coating composition | | | | | | | | | | |
| | Ex. 1 | Ex. 2 | Ex. 3 | Ex. 4 | Ex. 5 | Ex. 6 | Ex. 7 | Ex. 8 | Com. Ex. 1 | Com. Ex. 2 | Com. Ex. 3 |
| Adhesion | 100/100 | 100/100 | 100/100 | 100/100 | 100/100 | 100/100 | 100/100 | 100/100 | 100/100 | 100/100 | 100/100 |
| Boiling water resistance | 100/100 | 100/100 | 100/100 | 100/100 | 100/100 | 100/100 | 100/100 | 100/100 | 100/100 | 100/100 | 100/100 |
| Stain-proofing property | A | A | A | A | A | A | A | A | A | A | B |
| Weather resistance | 98 | 98 | 98 | 97 | 78 | 97 | 98 | 98 | 87 | 85 | 93 |

INDUSTRIAL APPLICABILITY

When the powder coating composition of the present invention is used, a coating line can be shared with other powder coating composition, and yet a coated article having a coating film excellent in physical properties can be provided.

What is claimed is:

1. A thermosetting powder coating composition, characterized in that the composition comprises (A) a fluorine-containing copolymer having crosslinkable functional group and (B) a curing agent and that the fluorine-containing copolymer (A) has a perfluoroolefin unit, has a fluorine content of not less than 10% by weight and is not dissolved in tetrahydrofuran substantially.

2. The thermosetting powder coating composition of claim 1, wherein a melting point of the fluorine-containing copolymer (A) having crosslinkable functional group is not more than 160° C.

3. The thermosetting powder coating composition of claim 1, wherein a melt flow rate of the fluorine-containing copolymer (A) having crosslinkable functional group is from 1 to 1,000 g/10 min when measured at 130° C. at a load of 2.1 kg.

4. The thermosetting powder coating composition of claim 3, wherein the fluorine-containing copolymer (A) having crosslinkable function group is a copolymer comprising tetrafluoroethylene, hexafluoropropylene, ethylene and monomer having crosslinkable functional group and being copolymerizable therewith.

5. The thermosetting powder coating composition of claim 3, wherein the fluorine-containing copolymer (A) having crosslinkable functional group is a copolymer comprising tetrafluoroethylene, hexafluoropropylene, isobutylene and monomer having crosslinkable functional group and being copolymerizable therewith.

6. The thermosetting powder coating composition of claim 3, wherein the crosslinkable functional group is at least one of hydroxyl, carboxyl and epoxy.

7. The thermosetting powder coating composition of claim 3, wherein the fluorine-containing copolymer (A) further contains a vinyl ester compound unit.

8. The thermosetting powder coating composition of claim 7, wherein the vinyl ester compound unit is a vinyl benzoate unit and/or a vinyl pivalate unit.

9. A coated article obtained by coating the thermosetting powder coating composition of claim 3 to a substrate and then baking it.

10. The thermosetting powder coating composition of claim 4, wherein the crosslinkable functional group is at least one of hydroxyl, carboxyl and epoxy.

11. The thermosetting powder coating composition of claim 5, wherein the crosslinkable functional group is at least one of hydroxyl, carboxyl and epoxy.

12. The thermosetting powder coating composition of claim 4, wherein the fluorine-containing copolymer (A) further contains a vinyl ester compound unit.

13. The thermosetting powder coating composition of claim 5, wherein the fluorine-containing copolymer (A) further contains a vinyl ester compound unit.

14. The thermosetting powder coating composition of claim 6, wherein the fluorine-containing copolymer (A) further contains a vinyl ester compound unit.

15. The thermosetting powder coating composition of claim 12, wherein the vinyl ester compound unit is a vinyl benzoate unit and/or a vinyl pivalate unit.

16. The thermosetting powder coating composition of claim 13, wherein the vinyl ester compound unit is a vinyl benzoate unit and/or a vinyl pivalate unit.

17. The thermosetting powder coating composition of claim 14, wherein the vinyl ester compound unit is a vinyl benzoate unit and/or a vinyl pivalate unit.

18. A coated article obtained by coating the thermosetting powder coating composition of claim 4 to a substrate and then baking it.

19. A coated article obtained by coating the thermosetting powder coating composition of claim 5 to a substrate and then baking it.

20. A coated article obtained by coating the thermosetting powder coating composition of claim 6 to a substrate and then baking it.

21. A method for powder coating of substrates utilizing a single coating line, which comprises powder coating first substrates with a first powder coating composition followed by baking and powder coating second substrates with a second powder coating composition followed by baking, said powder coating of first substrates and said powder coating of second substrates being carried out on the same coating line, either sequentially or in reverse order, wherein one of said first and second powder coating compositions is a thermosetting powder coating composition as claimed in claim 1 and wherein the other of said first and second powder coating compositions is soluble in THF.

* * * * *